(12) United States Patent
Chen et al.

(10) Patent No.: US 8,500,426 B2
(45) Date of Patent: Aug. 6, 2013

(54) APPARATUS FOR CONTROLLING COUNTERPRESSURE AND TEMPERATURE IN MOLD CAVITY

(75) Inventors: Shia-Chung Chen, Taoyuan County (TW); Ping-Shun Hsu, Taoyuan County (TW); Jen-An Chang, Taoyuan County (TW); Shyh-Shin Hwang, Taoyuan County (TW); Chia-Yen Tseng, Taoyuan County (TW)

(73) Assignee: Chung Yuan Christian University, Taoyuan County (TW)

( * ) Notice: Subject to any disclaimer, the term of this patent is extended or adjusted under 35 U.S.C. 154(b) by 84 days.

(21) Appl. No.: 13/217,726

(22) Filed: Aug. 25, 2011

(65) Prior Publication Data

US 2012/0052143 A1    Mar. 1, 2012

(30) Foreign Application Priority Data

Aug. 26, 2010    (TW) ................ 99128601 A

(51) Int. Cl.
*B29C 44/00*    (2006.01)
(52) U.S. Cl.
USPC ............ 425/4 R; 264/41; 264/85; 264/572; 425/130; 425/145; 425/149
(58) Field of Classification Search
USPC ............ 425/4 R, 130, 145, 149; 264/41, 264/85, 572
See application file for complete search history.

(56) References Cited

U.S. PATENT DOCUMENTS

2004/0084795 A1*    5/2004    Hornsby et al. ............ 425/4 R

FOREIGN PATENT DOCUMENTS

| CN | 101007437 | 8/2007 |
| JP | 2004-223879 | 8/2004 |

* cited by examiner

*Primary Examiner* — Tim Heitbrink

(74) *Attorney, Agent, or Firm* — WPAT, PC; Justin King

(57) ABSTRACT

A counterpressure/temperature control apparatus, comprises: a mold, having a runner and an air passage, both coupled to a mold cavity inside the mold; a logic control valve, coupled to the air passage for controlling a high-temperature gas or/and a counterpressure gas to flow in and out the mold cavity; a counterpressure gas supplying device, for supplying the counterpressure gas to the mold cavity through the logic control valve; and a high-temperature gas supplying device, for supplying the high-temperature gas to the mold cavity through the logic control valve; wherein the mold cavity is heated by the high-temperature gas, while subjecting the same to a counterpressure provided from the counterpressure gas supplying device during an injection molding process, and thereby, not only the surface quality of a product resulting from the injection molding process can be improved, but also the size of foams and the distribution evenness thereof are enhanced.

16 Claims, 3 Drawing Sheets

(a)

(d)

(b)

(e)

(c)

APPARATUS FOR CONTROLLING COUNTERPRESSURE AND TEMPERATURE IN MOLD CAVITY

FIELD OF THE INVENTION

The present invention relates to a technology of plastic injection molding, and more particularly, to an apparatus for controlling gas counterpressure and cavity temperature in a supercritical fluid (SCF) microcellular injection molding process (MuCell process).

BACKGROUND OF THE INVENTION

Injection molding is a manufacturing process for producing parts from both thermoplastic and thermosetting plastic materials, which is becoming more and more popular in plastic industry. In response to the quest for advanced and diversified product design and the thend for producing smaller, lighter and more delicate products with satisfactiry aesthetic and functional results, there are a diversity of plastic injetion molding processes being developed. Especially for producing exterior parts for automobiles, electronic devices or household eletric appliances that are generally large in volume but should still be built the lighter the better while maintaining good mechanical strength and high dimension stability, there are two advance injection molding techniques being developed today, which are the gas-assisted injection molding (GAIM) process and the MuCell process.

The MuCell Process involves the highly controlled use of gas in its supercritical state (SCF) to create millions of micron-sized voids in molded parts to make a foamed part, that is commercially developed by Trexel Co. Ltd. under worldwide exclusive license from the Massachusetts Institute of Technology (MIT). The MuCell process, being a plastic foaming process, is designed to produce microcellular plastic foams by mechanically or chemically dispersing an inert gas, usually carbon dioxide ($CO_2$) or nitrogen ($N_2$) that is used as foaming agent, into the polymer melt. Accordingly, the MuCell process is favored by its capability of performing in a high cell nucleation rate within the foaming material to create foams with evenly distributed and uniformly sized microscopic cells. In addition, since Earth's atmosphere is rich in carbon dioxide and nitrogen that they are easy to obtain, the cost of the MuCell process is comparatively less expensive, not to mention that the consumption of plastic material for producing form materials in this MuCell process can be reduced by more than 30%. Moreover, foam materials produced by this process offer improved consistency and homogeneity of cell structures, which can result in products with superior mechanical properties compared to other foaming systems. Thus, the MuCell technology not only offers reduction in manufacturing cost, but also can provide better product quality.

Despite of the aforesaid advantages, the products produced by the MuCell process generally have poor surface appearance. For overcoming such shortcoming, a gas counter pressure technology (GCP) was developed and widely applied in industry after year 1980.

In an injection molding method disclosed in Japanese Patent Application Laid-Open No. 2004-223879 by Asahi Kasei Cooperation, carbon dioxide is used as a counter pressure gas that is being injected into a mold cavity for pressurizing the same to a specific pressure prior to the filling of a foamable resin into the mold cavity, and thereby, not only the gas at the specific pressure will dissolve in the resin so as to reduce the melt viscosity of the resin, but also if the specific pressure is higher than the foaming pressure of the resin, the foaming of the resin will be suppressed, and if the specific pressure is lower than the foaming pressure of the resin, it can be used to produce products with evenly distributed microscopic cells but with different foam sizes by subjecting the resin to different counter pressures, while simultaneously improving the surface appearance and shrinkage/warpage of the resulting products. The GCP for injection molding process is operated as following:

(1) prior to the starting of a molding cycle, filling the mold cavity with a specific gas under an adequate pressure, whereas the specific gas can be an inert gas whichever is not going to react with the melt resin;
(2) filling the melt resin into the mold cavity for subjecting the flowing resin to a stable counter pressure;
(3) using a pressure control unit arranged at the outlet of the mold cavity for adjusting and thus maintaining the pressure stability of the mold cavity until the injection of the melt resin is completed; and
(4) retrieving the molded resin after cooling.

For the aforesaid injection molding process using GCP, a runner is required to be formed in the mold for connecting the mold cavity with outside world, so that leakage prevention mechanism as well as seals are required to be constructed near the whereabouts of the runner.

Because of the packing pressure effect working on the flow front of the melt resin by the counter pressure, the use of GCP for improving surface appearance as well as the shrinkage and warpage in the foamed products is becoming more and more popular. For example, in Year 2004, Ohshima uses carbon dioxide as counterpressure gas in a gas counter pressure (GCP) method for injection molding resins of low-density polyethylene (LDPE) and polypropylene (PP), in that by examining the molecular weight relating to the flow front of the melt resin, it is discovered that the gas is absorbed into the flow front of the flowing resin or enters into the interface between the mold and the resin and is dissolved in the surface layer of the resin. Moreover, in a $PC/SCN_2$ microcellular foaming process using GCP by Andrzej, et al., the surface roughness of an injection-molded tensile sample is reduce from 23.11 μm to 0.85 μm with even more evenly distributed foams being formed therein but at the cost that its weight reduction ratio is decreased from 12.8% to 10.2%. In addition, at Year 2006, Michaeli and Cramer overcome the surface defecting problem that is commonly seen in $_2$ microcellular foaming process by applying a gas counter pressure method in a MuCell process.

In addition, in a high-speed chemical foam injection molding method using gas counter pressure that is disclosed in CN 101007437A, after injecting a gas into a mold cavity of a closed mold for pressurizing the same, a melt resin is fed into the mold cavity for creating foamed resin filled with microcellular foams while enabling the surface of the foamed resign to abut exactly against the walls of the mold cavity. Thereafter, after the mold is cooled and the foamed resin inside the mold cavity is solidified and molded, the mold can be opened for retrieving a plastic part with glassy surface and evenly distributed microcellular foams. It is noted that the technique disclosed in the aforesaid Chinese patent is similar to the one disclosed in JPA 2004-223879.

For improving the surface appearance and quality of products produced by MuCell process, after experimenting repetitively, it is noted that by the use of counterpressure gas, not only surface quality can be improved, but also the size of forms to be established can be controlled as well as the distribution evenness thereof can be enhanced. Moreover, the proper control to the mold temperature is also helpful for surface quality improvement.

Therefore, it is in need of an apparatus for controlling gas counterpressure and mold temperature in a supercritical fluid (SCF) microcellular injection molding process for achieving better surface quality improvement and foam size control.

SUMMARY OF THE INVENTION

In view of the disadvantages of prior art, the primary object of the present invention is to provide an apparatus for controlling gas counterpressure and mold temperature in a supercritical fluid (SCF) microcellular injection molding process for achieving better surface quality improvement and foam size control.

To achieve the above object, the present invention provides a counterpressure/temperature control apparatus, which comprises: a mold, composed of two mold-halves that can be controlled to open and close, and having a runner and at least one air passage that are configured for communicating with at least one mold cavity formed inside the mold; a logic control valve, coupled to the at least one air passage of the mold for controlling a gas to flow in and out the mold cavity through the at least one air passage; a counterpressure gas supplying device, coupled to the logic valve for supplying the gas that is pressurized into a counterpressure gas to the mold cavity through the at least one air passage; and a high-temperature gas supplying device, coupled to the logic control valve for supplying the gas that is heated into a high-temperature gas to the mold cavity through the at least one air passage.

By the configuration of the counterpressure gas supplying device and the high-temperature gas supplying device in the apparatus of the present invention while enabling the two to work cooperatively, the mold cavity can be heated by the high-temperature gas from the high-temperature gas supplying device while the counterpressure gas supplying device is enabled to provide a counterpressure to the mold during a supercritical fluid (SCF) microcellular injection molding process, and thereby, not only the surface quality of a product resulting from the injection molding process can be improved, but also the size of the forms to be formed as well as the distribution evenness of the forms being produced in the injection molding process are enhanced so that the resulting product of the injection molding process can have better surface quality and proper foam size.

In a preferred embodiment of the invention, the high-temperature gas supplying device is configured with a heater to be used for heating the gas into the high-temperature gas for outputting.

In a preferred embodiment of the invention, the counterpressure gas supplying device is further configured with a first diverter valve in a manner that the first diverter valve is coupled respectively to the logic control valve and the high-temperature gas supplying device for enabling the counterpressure supplying device to supply the counterpressure gas to the high-temperature gas supplying device where the counterpressure gas is heated into the high-temperature so as to be used for heating the surface of the mold cavity while simultaneously establishing the counterpressure inside the same.

In a preferred embodiment of the invention, the high-temperature gas supplying device is further configured with an air compressor to be used for forcing and supplying the gas to the heat.

In a preferred embodiment of the invention, the air compressor is connected to a second diverter valve, while the counterpressure gas supplying device is further configured with a first diverter valve in a manner that the first diverter valve is coupled respectively to the logic control valve and the second diverter valve for enabling the counterpressure gas supplying device to supply the counterpressure gas to the heater of the high-temperature gas supplying device.

In a preferred embodiment of the invention, the high-temperature gas supplying device further comprises: an air dryer.

In a preferred embodiment of the invention, the high-temperature gas supplying device further comprises: a flow meter.

In a preferred embodiment of the invention, the counterpressure gas supplying device further comprises: a counterpressure gas source.

In a preferred embodiment of the invention, the counterpressure gas source is filled with a gas selected from the group consisting of: carbon dioxide and nitrogen.

In a preferred embodiment of the invention, the counterpressure gas supplying device further comprises:
a compressor, for pressuring the counterpressure gas so as to raise the pressure of the same.

In a preferred embodiment of the invention, the counterpressure gas supplying device further comprises: a proportional-integral-derivative (PID) control valve.

In a preferred embodiment of the invention, the PID control valve is coupled to a gas temperature sensor.

In a preferred embodiment of the invention, the mold is further comprises: at least one cavity temperature sensor.

In a preferred embodiment of the invention, the mold is further comprises: at least one cavity pressure sensor.

In a preferred embodiment of the invention, the mold is coupled to a mold temperature machine.

In a preferred embodiment of the invention, the mold temperature machine is configured with at least one mold temperature sensor in a manner that the at least one mold temperature sensor is disposed inside the mold.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention and wherein.

DESCRIPTION OF THE EXEMPLARY EMBODIMENTS

For your esteemed members of reviewing committee to further understand and recognize the fulfilled functions and structural characteristics of the invention, several exemplary embodiments cooperating with detailed description are presented as the follows.

Figure 1:
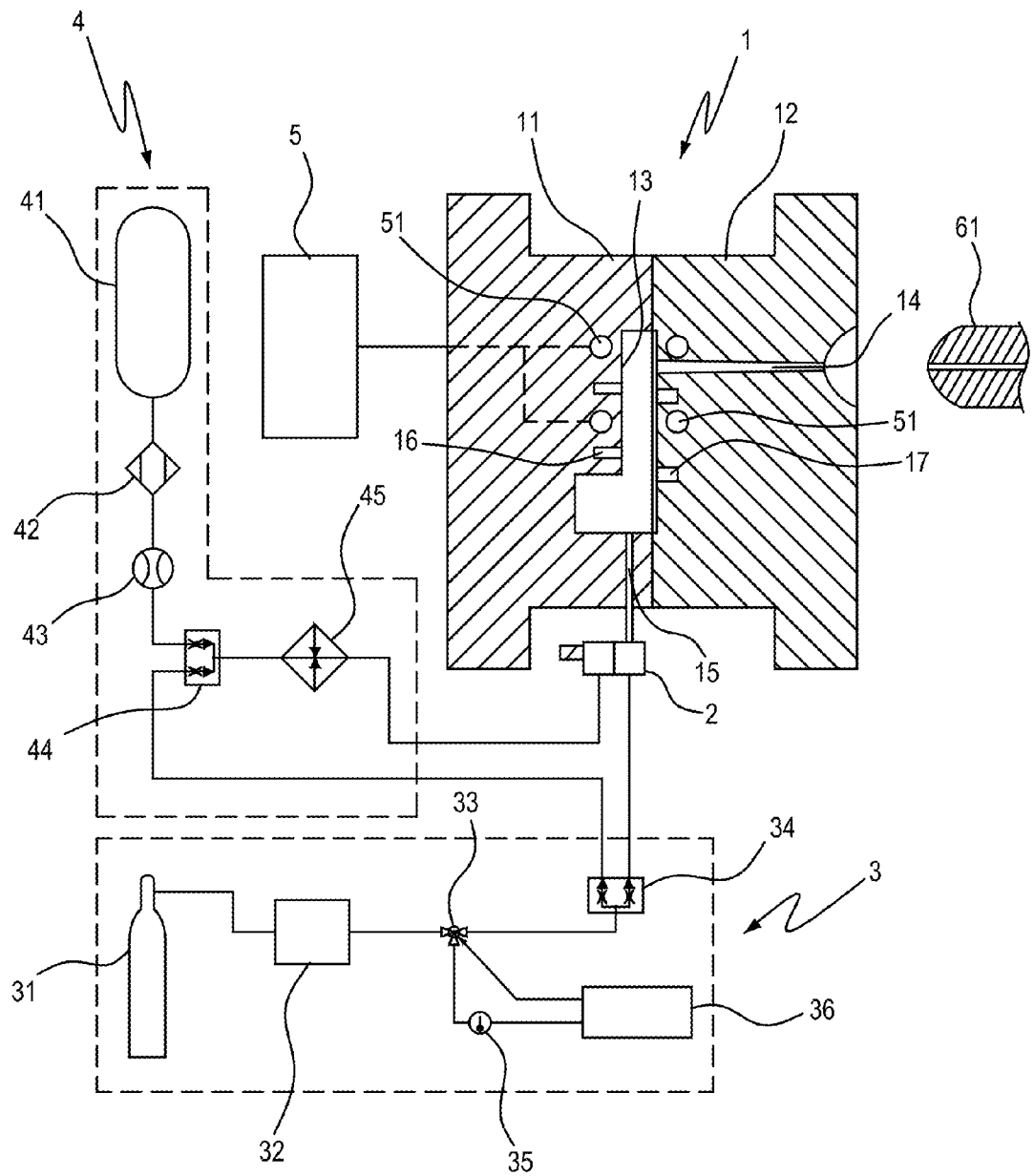
FIG. 1 is a schematic diagram showing an apparatus for controlling gas counterpressure and cavity temperature according to an embodiment of the invention.

Please refer to FIG. 1, which is a schematic diagram showing an apparatus for controlling gas counterpressure and cavity temperature according to an embodiment of the invention. As shown in FIG. 1, an apparatus for controlling counterpressure and temperature of mold cavity is primarily composed of: a mold 1, a logic control valve 2, a counterpressure gas supplying device 3 and a high-temperature gas supplying device 4.

The mold 1, being composed of two mold-halves 11, 12 that can be controlled to open and close, has a runner 14 and an air passage 15 that are configured for communicating with a mold cavity formed inside the mold 1 while the two mold-halves 11, 12 are closed.

In FIG. 1, an end of the runner 14 that is not connected to the mold cavity 13 is designed for enabling the same to tightly engage with a sprue 61 of a injection molding machine; and the air passage 15 is extending out of the mold 1 so as to connect to the logic control valve 2, so that the logic control valve can be used for controlling the air passage 15 to open or close.

In each of the two mold-halves 11, 12, there are at least one cavity temperature sensor 16 and at least one cavity pressure sensor 17 being arranged therein that are used for detecting the temperature and pressure of the mold cavity 13 in respective.

For maintaining the temperature of the mold 1 at a specific working temperature, the mold 1 is further coupled to a mold temperature machine 5. It is noted that the mold temperature machine 5 is a device known to those skilled in the art and thus will not be described further herein. Moreover, the mold temperature machine 5 should be further configured with at least one mold temperature sensor 51 in a manner that the at least one mold temperature sensor 51 is disposed inside the mold 1 for detecting and providing the temperature of the mold 1 so as to enable the mold temperature machine 5 to maintain the temperature of the mold 1 at the specific working temperature.

In addition, the counterpressure gas supplying device 3 further comprises: a counterpressure gas source 31, that in this embodiment, can be filled with a gas selected from the group consisting of: carbon dioxide and nitrogen. As shown in FIG. 1, the gas from the counterpressure gas source 31 is pressurized by a compressor 31 before being guided to flow through a proportional-integral-derivative (PID) control valve 33, where the gas is guided to flow through a first diverter valve 34 toward the logic control valve 2. Moreover, the PID control valve 33 is further connected to a gas temperature sensor 35 while enabling both the PID control valve 33 and the gas temperature sensor 35 to connected with a control unit 36, by that the output of the counterpressure gas source 31 can be controlled by the PID control valve 33 in conjunction with the control unit 36.

In FIG. 1, the high-temperature gas supplying device 4 is further comprised of an air compressor 41, whereas the air compressor 41 is first being connected sequentially to an air dryer 42 and a flow meter 43, and then is connected to the logic control valve 2 sequentially through a second diverter valve 44 and a heater 45, by that the gas can be heated before flowing into the mold cavity 13 through the air passage 15.

Moreover, the second diverter valve 44 of the high-temperature gas supplying device 4 is connected to the first diverter valve 34 of the counterpressure gas supplying device 3, by that the gas that is pressurized into a counterpressure gas by the counterpressure gas supplying device 3 is guided to flow sequentially through the first diverter valve 34 and the second diverter valve 44 to the heater 45 where the counterpressure gas is heated into a high-temperature counterpressure gas to be supply to the mold cavity 13 through the logic control vale 2 and the air passage 15.

Figure 2:
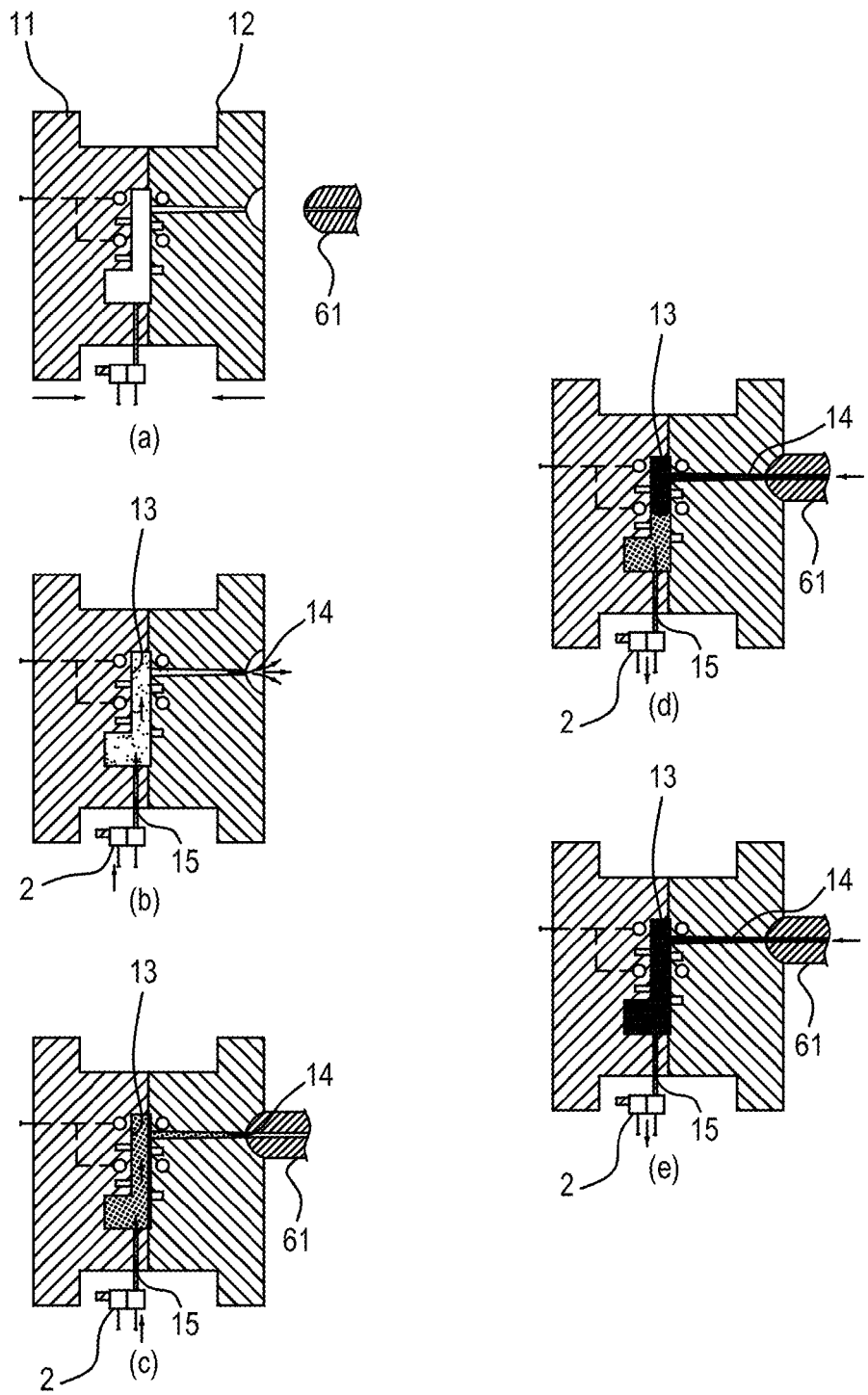
FIG. 2(A) to FIG. 2(E) are sequence diagrams showing the operation of a counterpressure/temperature control apparatus of the present invention.
Figure 3:
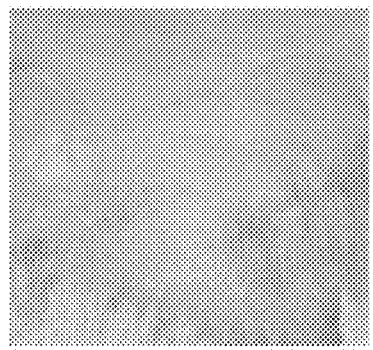
FIG. 3(A) to FIG. 3(E) are diagrams illustrating the surface quality of different molded products produced under different cavity temperatures.
Figure 3:
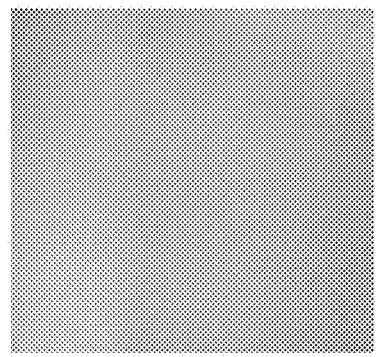
Figure 3:
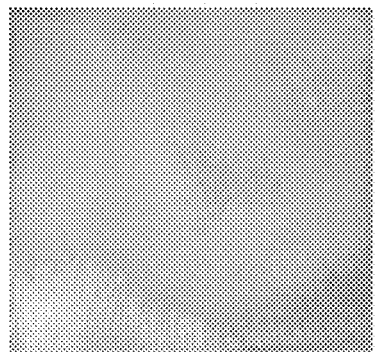
Figure 3:
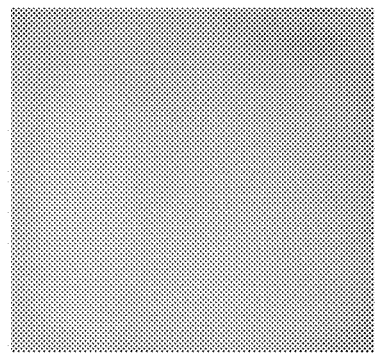
Figure 3:
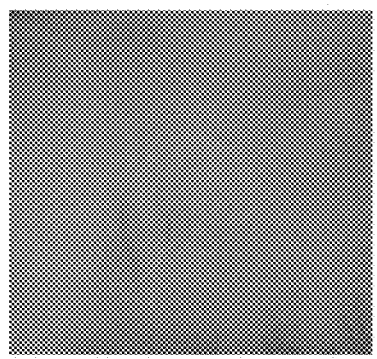

Please refer to FIG. 2(A) to FIG. 2(E), which are sequence diagrams showing the operation of a counterpressure/temperature control apparatus of the present invention. In FIG. 2(A), the two mold-halves 11, 12 are integrated and closed to form a mold 1 so as to be ready for a MuCell process under the condition that an apparatus for controlling gas counterpressure and cavity temperature of the invention is used in the MuCell process while all the materials required for the MuCell process are already available and parameter configuration for the MuCell process are set. In FIG. 2(B), by the control of the logic control valve 2, a gas that is heated into a high-temperature gas by the high-temperature gas supplying device 4 is fed into the mold cavity 13 through the air passage 15 and then is being discharged out of the mold cavity 13 through the runner 14, whereby the surface of the mold cavity 13 is heated by the high-temperature gas.

As shown in FIG. 2(C), after the mold cavity 1 is heated to a specific temperature, the sprue 61 of a injection molding machine is ejected to engage tightly with the runner 14 while simultaneously enabling the logic control valve 2 to stop the feeding of the high-temperature gas into the mold cavity 13 and enabling the counterpressure gas supplying device 3 to supply the gas that is pressurized thereby into a counterpressure gas into the mold cavity 13 through the air passage 15; and as soon as the mold cavity 13 achieves a specific pressure, the supplying of the counterpressure gas from the counterpressure gas supplying device 3 is stopped by the logic control valve 2 while switching the logic control valve to an operation state for releasing pressure.

Following, as shown in FIG. 2(D), a microcellular foaming material is injected into the mold 1 through the sprue 61 while enabling the counterpressure gas to keep discharging by the control of the logic control valve 2. Thereafter, as shown in FIG. 2(E), the pressure of the mold cavity 13 is maintained at a constant until the aforesaid material injection is completed. Then, it is obvious that the mold can be opened for retrieving the product of the MuCell process after the mold 1 as well as the material inside the mold 1 are cooled down completely.

By using the high-temperature gas from the high-temperature gas supplying device to heat up the surface of the mold cavity 13, the surface quality of a product resulting from the injection molding process can be improved. Please refer to FIG. 3(A) to FIG. 3(E), which are diagrams illustrating the surface quality of different molded products produced under different cavity temperatures, i.e. at 60° C., 100° C., 140° C., 180° C. and 220° C. in respective. As shown in FIG. 3(A) to FIG. 3(E), it is noted that the higher the cavity temperature is, the better the surface quality can be achieved. That is, by controlling the surface temperature of the mold cavity during the injection molding process, the surface quality of the produce resulting from the injection molding process can be controlled and improved accordingly.

Moreover, through the control of the pressure of the mold cavity 13, not only the surface quality of a product resulting from the injection molding process can be improved, but also the size of foams and the distribution evenness thereof are enhanced.

To sum up, by the configuration of the counterpressure gas supplying device 3 and the high-temperature gas supplying device 4 in the apparatus of the present invention while enabling the two to work cooperatively, the mold cavity 13 can be heated by the high-temperature gas from the high-temperature gas supplying device 4 during a supercritical fluid (SCF) microcellular injection molding process when it is intended to improve the surface quality of a product resulting from the injection molding process, or/and the counterpressure gas supplying device 3 is enabled to provide a counterpressure to the mold when it is intended to enhance the distribution evenness of forms being produced in the injection molding process and also enable the produce to have proper foam size. Moreover, when it is intended to enhance the distribution evenness of forms being produced in the injection molding process while simultaneous enable the produce to have better surface quality and proper foam size, the counterpressure gas supplying device 3 can be enabled to work in conjunction with the high-temperature gas supplying device 4 so as to enable the mold cavity 13 to be heated by the high-temperature gas while being pressurized by the counterpressure gas at the same time; or by guiding the counterpressure gas from the counterpressure gas supplying device 3 to flow sequentially through the first diverter valve 45 and the second diverter valve 44 to the heater 45 of the high-temperature gas supplying device 4 where it is heated into the high-temperature gas before being fed into the mold cavity 13 so as to be used for heating the surface of the mold cavity while simultaneously establishing the counterpressure inside the same.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

What is claimed is:

1. An apparatus for controlling counterpressure and temperature in mold cavity, comprising:
    a mold, composed of two mold-halves that can be controlled to open and close, having a runner and at least one air passage that are configured for communicating with at least one mold cavity formed inside the mold;
    a counterpressure gas supplying device, for supplying the gas that is pressurized into a counterpressure gas to the mold cavity through the at least one air passage;
    a high-temperature gas supplying device, for supplying the gas that is heated into a high-temperature gas to the mold cavity through the at least one air passage; and
    a logic control valve, coupled to the counterpressure gas supplying device, the high-temperature gas supplying device, and the at least one air passage of the mold, for controlling the gas exiting the counterpressure gas supplying device and the gas exiting the high-temperature gas supplying device, and the gas to flow in and out of the mold cavity through the at least one air passage.

2. The apparatus of claim 1, wherein the high-temperature gas supplying device is configured with a heater to be used for heating the gas into the high-temperature gas for outputting.

3. The apparatus of claim 2, wherein the counterpressure gas supplying device is further configured with a first diverter valve in a manner that the first diverter valve is coupled respectively to the logic control valve and the high-temperature gas supplying device for enabling the counterpressure supplying device to supply the counterpressure gas to hater of the high-temperature gas supplying device.

4. The apparatus of claim 2, wherein the high-temperature gas supplying device is further configured with an air compressor to be used for forcing and supplying the gas to the heat.

5. The apparatus of claim 4, wherein the air compressor is connected to a second diverter valve, while the counterpressure gas supplying device is further configured with a first diverter valve in a manner that the first diverter valve is coupled respectively to the logic control valve and the second diverter valve for enabling the counterpressure gas supplying device to supply the counterpressure gas to the heater of the high-temperature gas supplying device.

6. The apparatus of claim 1, wherein the high-temperature gas supplying device further comprises: an air dryer.

7. The apparatus of claim 1, wherein the high-temperature gas supplying device further comprises: a flow meter.

8. The apparatus of claim 1, wherein the counterpressure gas supplying device further comprises: a counterpressure gas source.

9. The apparatus of claim 8, wherein the counterpressure gas source is filled with a gas selected from the group consisting of: carbon dioxide and nitrogen.

10. The apparatus of claim 8, wherein the counterpressure gas supplying device further comprises:
    a compressor, for pressuring the counterpressure gas so as to raise the pressure of the same.

11. The apparatus of claim 1, wherein the counterpressure gas supplying device further comprises: a proportional-integral-derivative (PID) control valve.

12. The apparatus of claim 11, wherein the PID control valve is coupled to a gas temperature sensor.

13. The apparatus of claim 1, wherein the mold is further comprises: at least one cavity temperature sensor.

14. The apparatus of claim 1, wherein the mold is further comprises: at least one cavity pressure sensor.

15. The apparatus of claim 1, wherein the mold is coupled to a mold temperature machine.

16. The apparatus of claim 15, wherein the mold temperature machine is configured with at least one mold temperature sensor in a manner that the at least one mold temperature sensor is disposed inside the mold.

* * * * *